Figure 2:
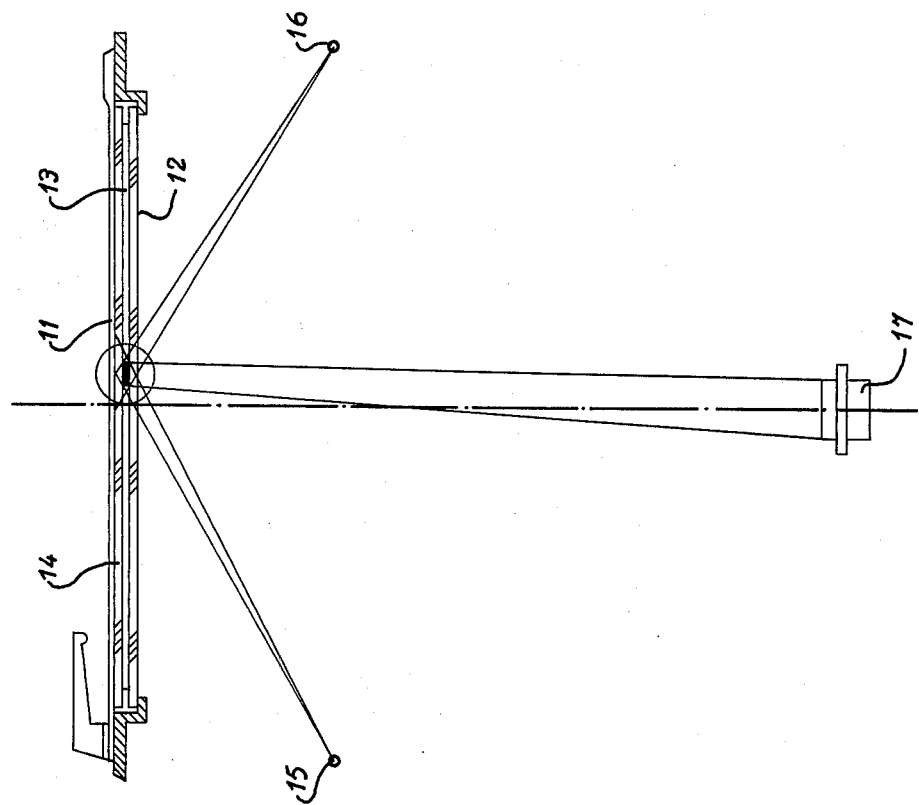

United States Patent [19]
Vola

[11] 3,957,370
[45] May 18, 1976

[54] COPYING DEVICE WITH A SYSTEM FOR A REFLEX EXPOSURE OF THE ORIGINAL

[75] Inventor: Mathias J. J. M. Vola, Sittard, Netherlands

[73] Assignee: Oce-van der Grinten N.V., Venlo, Netherlands

[22] Filed: Oct. 23, 1974

[21] Appl. No.: 517,169

[30] Foreign Application Priority Data
Nov. 8, 1973  Netherlands...................... 7315328

[52] U.S. Cl................................... 355/11; 355/67; 355/75
[51] Int. Cl.² .................. G03G 15/00; G03B 27/54; G03B 27/62
[58] Field of Search ................... 355/18, 67, 71, 75, 355/76, 77, 113, 133, 11

[56] References Cited
UNITED STATES PATENTS
3,119,301  1/1964  Beattie et al.......................... 355/77

Primary Examiner—Richard A. Wintercorn
Attorney, Agent, or Firm—Albert C. Johnston

[57] ABSTRACT

A photocopying apparatus utilizing an exposure plate on which an original pressed image-side downward is exposed to give a reflex image by light from sources disposed laterally below that plate, is caused to give sharper reflex images of transparent originals by the provision of a transparent layer placed over the original, whereby the edge shadows of opaque image portions of the original are broadened and produce displaced reflection areas of reduced intensity. The transparent layer preferably has a thickness of at least 5 mm., and a roughened, translucent surface contacting the original. It may be a frosted glass plate serving also to press the original against the exposure plate.

8 Claims, 3 Drawing Figures

COPYING DEVICE WITH A SYSTEM FOR A REFLEX EXPOSURE OF THE ORIGINAL

The invention relates to a copying device with a system for a reflex exposure of the original to be copied, generally consisting of an exposure plate on which the original may be laid with the image-side downwards, a plate- or sheetlike pressing means for pressing the original against the exposure plate, a pair of light-sources arranged laterally below the exposure plate and a system of lenses arranged centrally below the exposure plate.

Such a system for a reflex exposure in an electrographic copying device is already known, whereby a so-called charge-pattern of the original is formed on an electrostatically charged photoconductive master, subsequently this pattern is developed with a toner powder, and the powder image thus obtained is transferred onto a receiving material.

Such a copying device makes it possible to obtain copies with sharply outlined image-portions of an original consisting of a relatively opaque material. However, with an original of a relatively transparent material, for instance a lacquered transparent paper, the copied image-portions are not reproduced so sharply.

The object of the invention therefore is to provide a copying device with a system for a reflex exposure of the original, with which also of an original of a transparent material copies of good quality can be obtained.

It has appeared that the less sharp reproduction of the image-portions of a transparent original on the copy is due to the fact that on the reflection-surface formed by the pressing means a shadow-edge is formed of the image-portions, which results in fading of the edges of the image-portions.

With the device according to the invention a layer of a transparent medium is applied between the light reflecting pressing means and the original, by which the shadow edge is diffused over a greater surface and the copied image-portions are reproduced more sharply.

Due to the presence of the transparent medium the optical density of the shadow is decreased to such an extent that a slight over-exposure is usually sufficient to obtain a completely shadowless copy.

Preferably the layer of transparent medium has a thickness of at least 5 mm and may be formed by a glass plate which may advantageously have the same size and thickness as the exposure plate.

As originals containing very thin and very thick lines will produce shadows with a rather high optical density, it is sometimes possible that the optical density of the shadows of the thick lines is too high to suppress it by overexposure without loss of portions of the image of the thin lines. For this reason in a preferred embodiment of the invention the surface of the transparent medium which is closest to the original to be copied is provided with a roughened translucent layer to disperse the shadows to a larger extent.

A suitable roughened translucent layer is formed by a sheet of synthetic drawing paper. Such a paper is a semitransparent material which usually is composed of one or more thin plastic layers of which at least one surface is roughened in a mechanical way or by etching or incorporating finely divided pigments.

According to the invention the pressure plate, the transparent medium and the roughened translucent layer may be combined in one member. For example by providing one surface of a transparent glass plate with a reflecting layer such as a white paint or a metallic layer and by providing the opposite surface with a roughened translucent layer by roughening said surface of the transparent glass plate.

Figure 1:
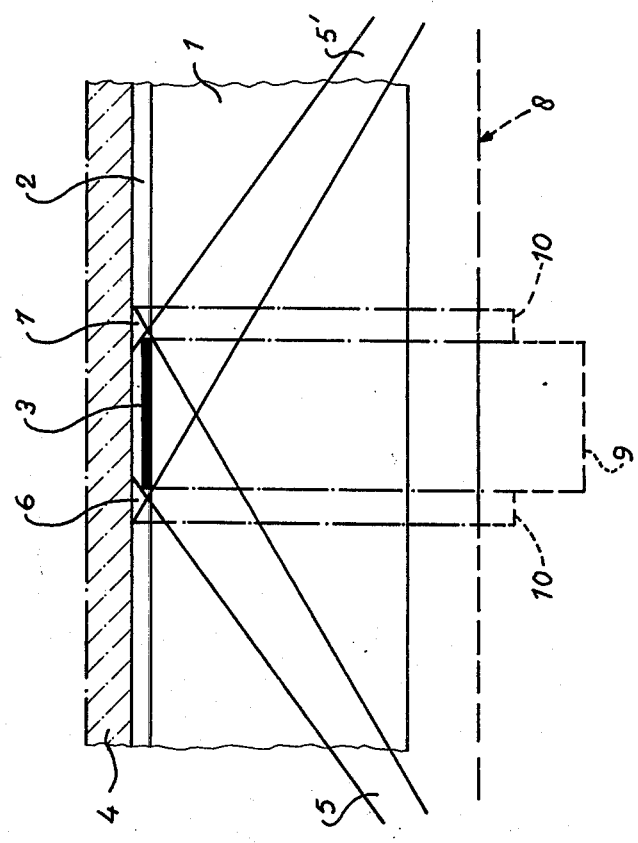
Figure 3:
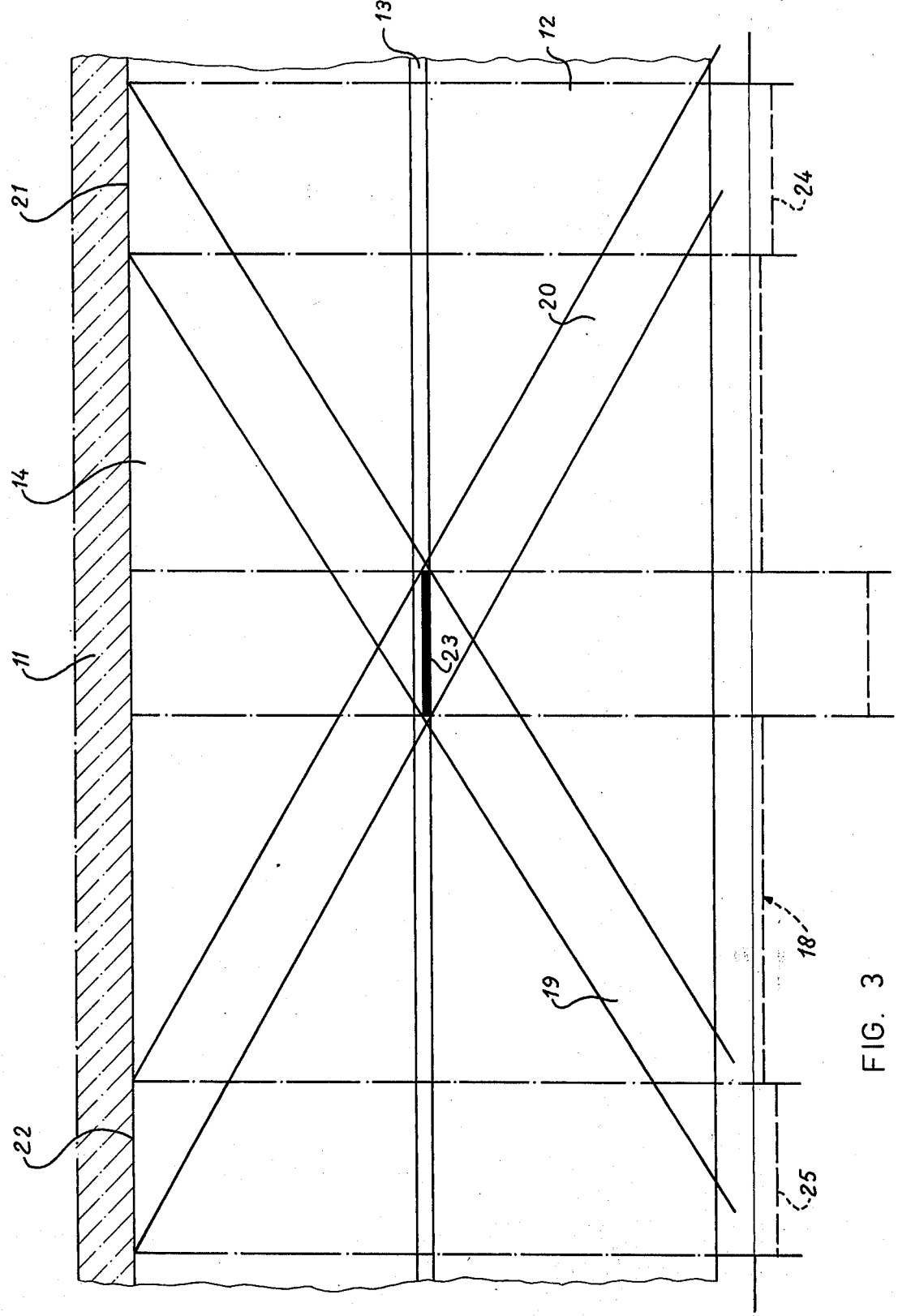

The invention will now be further explained with the aid of the pertaining drawings in which:

FIG. 1 schematically shows the existence of a shadow image along the edges of an image-portion to be copied, FIG. 2 shows the device according to the invention in a simplified way, and FIG. 3 shows on enlarged scale the section encircled in FIG. 2.

FIG. 1 shows a part of the exposure plate 1 of a system for reflex exposure, with an original 2 laid down on it, which original is provided with image-portions, of which one is schematically represented near 3. The light-beams 5 and 5' schematically represented and emitted by non-represented light-sources, hit the original 2, and round the image-portion 3 shadow edges 6 and 7 are produced on the reflection surface of the pressing means 4, as a result of the fact, that these edges are only exposed by one lightsource.

In the lower part of FIG. 1 the intensity-diffusion of the reflected light is shown in a simplified way by the interrupted line 8, which indicates that at either side of the portion 9 corresponding with the image-portion 3, where the intensity of the reflected light is the lowest, zones 10 with a higher intensity are present, which give rise to the existence of faded edges at the image-portions on the copy, so that these are not reproduced sharply.

In FIG. 2 the device according to the invention is shown, whereby between the pressing means or the pressing plate 11 and the original 13 lying on the exposure plate 12 a glass plate 14 is installed. Further this Fig. also shows the flash-lamps, which for simplification are considered as point light-sources 15 and 16, for the exposure of the original, and the lens-system 17.

The effect of the device according to the invention is clarified in FIG. 3, which in fact shows the section encircled in FIG. 2 on an enlarged scale, whereby however the pressing plate 11 is only shown partially. In the same way as in FIG. 1 the intensity-diffusion of the reflected light has been indicated in the lower part of FIG. 3 by the line 18, whereby it appears that by the installation of the glass plate 14 the shadow edges 21 and 22 of the image-portion 23, formed by the light-beams 19 and 20 produce the areas 24 and 25 of lower reflection-intensity, which in comparison with FIG. 1 have a greater surface and are not fully adjacent to the image-portion, so that the image-portion 23 can be reproduced more sharply and with more contrast.

I claim:

1. In an apparatus for copying originals by reflex exposure, including an exposure plate to support an original thereon with its image side downwards, a plate- or sheet-like device for pressing the original against said exposure plate, light sources disposed laterally at opposite sides below said plate, said pressing device having a light reflective surface for reflecting light passed thereto through a light-transmitting original, and a lens system disposed centrally below said plate for collecting light reflected from the original or from said pressing device, the improvement which comprises a layer of transparent material disposed between said pressing device and an original on said exposure plate for broadening and thus reducing the reflection intensity of the shadow regions of image portions of the original in the exposure of a light-transmitting original.

2. Apparatus according to claim 1, said layer having a thickness of at least 5 mm.

3. Apparatus according to claim 1, said layer having on the side thereof to be contacted with the original a semi-transparent roughened surface for dispersing edge shadow lines of said image portions.

4. Apparatus according to claim 3, said layer being constituted by a sheet of transparent plastic material having said roughened surface on at least one side thereof.

5. Apparatus according to claim 3, said pressing device and said layer being combined into a unitary member for holding down the original and broadening image shadow regions of a transparent original.

6. Apparatus according to claim 1, said layer being constituted by a glass plate having a frosted surface on the side thereof to be contacted with the original.

7. Apparatus according to claim 6, said glass plate having substantially the same size and thickness as said pressing device.

8. Apparatus according to claim 1, said pressing device and said layer being both constituted by a glass plate having a frosted surface on the side thereof to be contacted with the original and having a light reflecting layer on the other side thereof.

* * * * *